US012789379B2

(12) United States Patent
Imaoka et al.

(10) Patent No.: US 12,789,379 B2
(45) Date of Patent: Nov. 10, 2026

(54) ROBOT SYSTEM

(71) Applicant: NACHI-FUJIKOSHI CORP., Tokyo (JP)

(72) Inventors: Makoto Imaoka, Toyama (JP); Tetsuya Hayashi, Toyama (JP); Yoshitaka Ooi, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 6 days.

(21) Appl. No.: 19/027,584

(22) Filed: Jan. 17, 2025

(65) Prior Publication Data

US 2025/0242494 A1 Jul. 31, 2025

(30) Foreign Application Priority Data

Jan. 30, 2024 (JP) ................................ 2024-011631

(51) Int. Cl.
*B25J 9/16* (2006.01)
*B25J 13/08* (2006.01)
*B25J 19/02* (2006.01)

(52) U.S. Cl.
CPC ........... *B25J 9/1666* (2013.01); *B25J 9/1605* (2013.01); *B25J 13/088* (2013.01); *B25J 19/021* (2013.01)

(58) Field of Classification Search
None
See application file for complete search history.

(56) References Cited

U.S. PATENT DOCUMENTS 11,675,329 B2 * 6/2023 Pritchard .............. B25J 9/1676 700/28
12,076,869 B2 * 9/2024 Landi ..................... B25J 9/1697
(Continued)

FOREIGN PATENT DOCUMENTS

CN 110856932 A 3/2020
JP H0816234 A 1/1996
(Continued)

OTHER PUBLICATIONS

JP2018012159A—Description Translation (Year: 2018).*
(Continued)

*Primary Examiner* — Khoi H Tran
*Assistant Examiner* — Trang Dang
(74) *Attorney, Agent, or Firm* — Crowell & Moring LLP

(57) ABSTRACT

A processor of a controller executes processes of: storing values of link parameters of a robot in a memory; collecting data points, which include a set of coordinates that set forth positions of surface points in a surface of an object found in a space; collecting joint angles of respective joints of a robot arm; generating a virtual robot model simulating a contemporaneous posture of the robot based on the link parameters and the joint angles; removing at least data points representing the robot from the collected data points by using the virtual robot model and presenting the remaining data points as a representation of the interfering object; and calculating a distance between the potentially interfering object and the robot by using the representation and the virtual robot model and determining whether the potentially interfering object is approaching the robot or not, based on the calculated distance.

4 Claims, 6 Drawing Sheets

(56) References Cited

U.S. PATENT DOCUMENTS

| | | | | |
|---|---|---|---|---|
| 2016/0368142 | A1 | 12/2016 | Matsunami et al. | |
| 2020/0061825 | A1 | 2/2020 | Warashina et al. | |
| 2021/0178605 | A1 | 6/2021 | Shigetaka | |
| 2022/0088787 | A1* | 3/2022 | Vu | B25J 9/1676 |
| 2023/0166406 | A1 | 6/2023 | Landi et al. | |
| 2025/0065503 | A1* | 2/2025 | Nasu | B25J 9/1605 |

FOREIGN PATENT DOCUMENTS

| | | | | |
|---|---|---|---|---|
| JP | 2015174184 | A | | 10/2015 |
| JP | 2018012159 | A | * | 1/2018 |
| JP | 2019171499 | A | | 10/2019 |
| JP | 7109562 | B2 | | 7/2022 |
| JP | 2023004158 | A | | 1/2023 |
| JP | 2023079994 | A | | 6/2023 |

OTHER PUBLICATIONS

Notice of Reasons for Refusal in Japanese Patent Application No. 2024-011631 (with English Translation) dated Mar. 15, 2024 (9 pages).

Decision to Grant a Patent in Japanese Patent Application No. 2024-011631 (with English Translation) dated Jun. 3, 2024 (6 pages).

First Office Action issued in Japanese Application No. 202411583438.7 dated Sep. 7, 2025, with English translation (13 pages).

Extended European Search Report issued in European Application No. 25152296.7, dated Jun. 26, 2025 (10 pages).

* cited by examiner

ROBOT SYSTEM

RELATED APPLICATIONS

This application is based upon and claims the benefit of priority from the prior Japanese Patent Application No. JP2024-011631, filed on Jan. 30, 2024, the entire content of which is incorporated herein by reference.

BACKGROUND OF THE INVENTION

1. Field of the Invention

The present invention relates to a robot system that detects an approach of a potentially interfering object such as a human.

2. Description of the Related Art

In recent years, collaborative robots that work in collaboration with humans without the necessity of setting up safety fences have been studied. Safety measures for such collaborative robots include a method in which a robot avoids a potentially dangerous consequence when detecting a contact with an interfering object such as a human, and a method in which a robot avoids a potentially dangerous consequence when detecting an approach of a potentially interfering object. It can be said that the latter method can provide a higher degree of safety than the former method because the latter method makes possible to issue a movement instruction to evade a danger of contact with a potentially interfering object before the contact actually occurs. As an example of the latter method, Japanese Patent Publication No. 7109562 describes a system using a proximity sensor that detects a proximity to an object based on a change in electrostatic capacitance created between the object and the system.

SUMMARY OF THE INVENTION

However, the proximity sensor adopting the electrostatic capacitance method is known to detect external wires, a fixture base and other equipment of the robot as potentially interfering objects. Since a robot controller that controls the robot's movement is taught in advance about the positions of the robot's peripherals and their parts and controls the robot so that the robot arm will not come into contact with the peripherals or their parts, there is no need to detect the peripherals or their parts as potentially interfering objects. If the robot detects the peripherals and their parts as potentially interfering objects, the robot may not be able to perform intended movements, or its range of movement may be restricted, resulting in a significant drop in production efficiency.

The present invention was made in view of the forgoing. It is an object of the present invention to provide a robot system that distinguishes between the robot itself and a potentially interfering object and detects an approach of the potentially interfering object.

To achieve the above object, a first representative configuration of some of the embodiments of the present invention is a robot system that includes at least one robot having a robot arm, at least one three-dimensional sensor that photographically scans a space including a work range of the robot, and at least one controller that controls movements of the robot and the three-dimensional sensor. The controller includes at least one memory and at least one processor to execute a computer program stored in the at least one memory. The at least one processor performs processes of storing values of link parameters of the robot in the at least one memory, collecting data points, from the at least one three-dimensional sensor, which include a set of coordinates that set forth positions of surface points in a surface of an object found in the space, collecting a contemporaneous state of joint angles of respective joints of the robot arm, generating a virtual robot model that assumes a posture that simulates a contemporaneous posture of the robot based on the link parameters and the joint angles, removing at least data points representing the robot itself from the collected data points by using the virtual robot model and presenting the remaining data points as a representation of a potentially interfering object, which is defined by a set of coordinates that sets forth positions of surface points of the potentially interfering object, and calculating a distance between the potentially interfering object and the robot by using the representation of the potentially interfering object and the virtual robot model, and determining whether the potentially interfering object is approaching the robot or not, based on the calculated distance between the potentially interfering object and the robot.

DETAILED DESCRIPTION OF THE PREFERRED EMBODIMENTS

Figure 1:
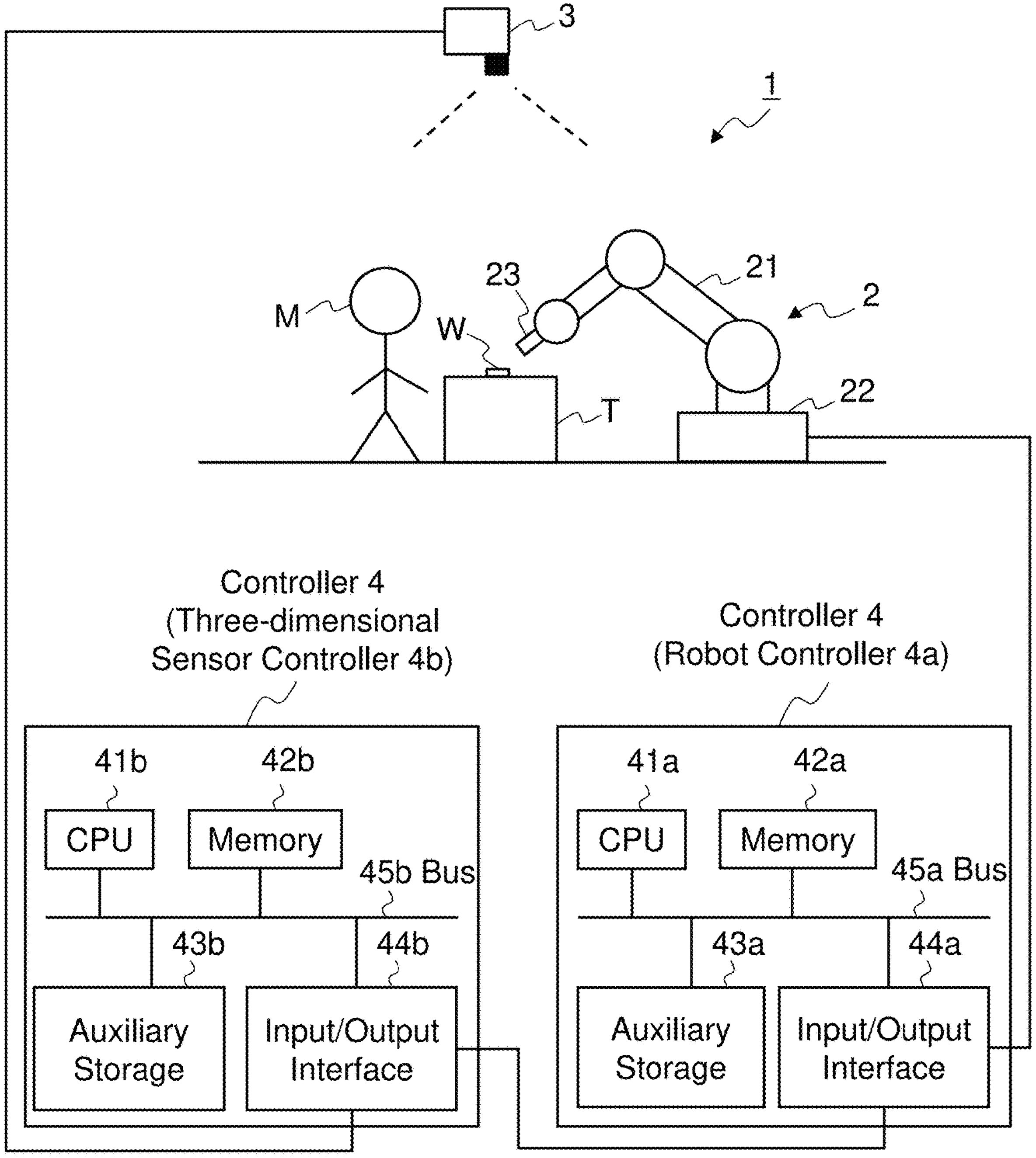
FIG. 1 is a view illustrating an overview of a robot system according to an embodiment of the present invention.

Hereinafter, embodiments of the present invention will be described with reference to the accompanying drawings. FIG. 1 is a view illustrating an overview of a robot system according to an embodiment of the present invention. As shown in FIG. 1, a robot system 1 includes at least one robot 2 having a robot arm 21, at least one three-dimensional sensor 3 that photographically scans a space including a space for the work range of the robot 2, and at least one controller 4 that controls movements of the robot 2 and the at least one three-dimensional sensor 3. In the space in which images are taken by the three-dimensional sensor 3, a work W or a table T may be placed. Also, the robot 2 is a collaborative robot, and a person M may be present in the space in which images are taken by the at least one three-dimensional sensor 3.

The robot 2 includes a fixture base 22 that supports the robot arm 21, and an end effector 23 is attached to the distal end of the robot arm 21. The robot arm 21 is configured with a link mechanism having a plurality of links, and the robot arm 21 includes joints that connect the links, one link to another. Each joint is provided with a drive motor, whose illustration is omitted from the drawings. An example of the robot 2 is a vertically articulable robot with six joints. However, the present invention is workable with robots having five joints or less, or having seven joints or more, or even to horizontally articulable robots, etc. Also, the robot 2 is not limited to a single-arm robot and may be a dual-arm robot.

The three-dimensional sensor 3 is a sensor that can measure a three-dimensional position of an object and generates a collection of data points, which is a set of coordinates that define the positions of the detected points in a surface of the object placed in a target space to be photographically scanned. Nonlimiting examples of the three-dimensional sensor 3 include an active stereo camera, a passive stereo camera, a three-dimensional light detection and ranging (LiDAR) sensor, and a time of flight (ToF) camera. The date points generated by the three-dimensional sensor 3 are each set forth as orthogonal coordinates in three-dimensional orthogonal coordinates (x, y, z). A detectable range of each coordinate of the three-dimensional coordinates (x, y, z) depends on an angle range of view and a distance range of view that can be covered by the three-dimensional sensor 3. Nonlimiting examples of file formats in which the collection of date points may be generated include Point Cloud Data (PCD) files developed by Point Cloud Library (PCL), which is an open source library.

The three-dimensional sensor 3 may be installed at a ceiling to take images from above the robot 2, or may be installed on a wall or on a tripod or the like to take images horizontally at the height of the robot 2. Also, the three-dimensional sensor 3 may be installed on the robot arm 21 or the end effector 23, or the like to take images in an imaging range that only partially includes the robot 2. Furthermore, if there is a range of space that cannot be scanned with one three-dimensional sensor 3 (such as a space behind the robot 2), the three-dimensional sensors 3 may be installed in a plurality of places, and a collection of data points obtained from each of the plurality of three-dimensional sensors 3 may be combined.

The controller 4 includes a robot controller 4*a* for controlling movements of the robot 2 and a three-dimensional sensor controller 4*b* for controlling movements of the three-dimensional sensor 3. The robot controller 4*a* may be built into the fixture base 22 of the robot 2, or may be installed apart from the robot 2. In the latter case, the robot 2 and the robot controller 4*a* are connected for communication with each other via a communication cable or wirelessly. Similarly, the three-dimensional sensor controller 4*b* may be integrated with or separated from the three-dimensional sensor 3. In the latter case, the three-dimensional sensor 3 and the three-dimensional sensor controller 4*b* are co connected for communication with each other via a communication cable or wirelessly. Also, the robot controller 4*a* and the three-dimensional sensor controller 4*b* are connected for communication with each other via a communication cable or wirelessly.

A central processing unit (CPU) 41*a*, a memory 42*a*, an auxiliary storage 43*a*, and an input/output interface 44*a* of the robot controller 4*a* are connected for communication with each other via a bus 45*a*. The CPU 41*a* reads out a control program stored in advance in the auxiliary storage 43*a* or the like, deploys the program in the memory 42*a* and executes a plurality of commands in the program. The auxiliary storage 43*a* may be a hard disk drive, a solid-state drive, or the like, and stores data used in the processes described below. The input/output interface 44*a* receives signals from the robot 2, the three-dimensional sensor controller 4*b*, and other devices, and outputs signals thereto.

A central processing unit (CPU) 41*b*, a memory 42*b*, an auxiliary storage 43*b*, and an input/output interface 44*b* of the three-dimensional sensor controller 4*b* are connected to each other via a bus 45*b*. The CPU 41*b* reads out a control program stored in advance in the auxiliary storage 43*b*, deploys the program in the memory 42*b* and executes a plurality of commands in the program. The auxiliary storage 43*b* may be a hard disk drive, a solid-state drive, or the like, and stores data used in the processes described below. The input/output interface 44*b* receives signals from the three-dimensional sensor 3, the robot controller 4*a*, and other devices, and outputs signals thereto.

Although two sets of the controllers 4, that is, the robot controller 4*a* and the three-dimensional sensor controller 4*b*, are illustrated in FIG. 1, only one set of the controller 4 or three or more sets of controllers 4 may be used. In the descriptions hereafter, the robot system 1 includes two sets of the controllers 4, which are the robot controller 4*a* and the three-dimensional sensor controller 4*b*, and the two sets of controllers 4 cooperate with each other to perform processes.

Figure 2:
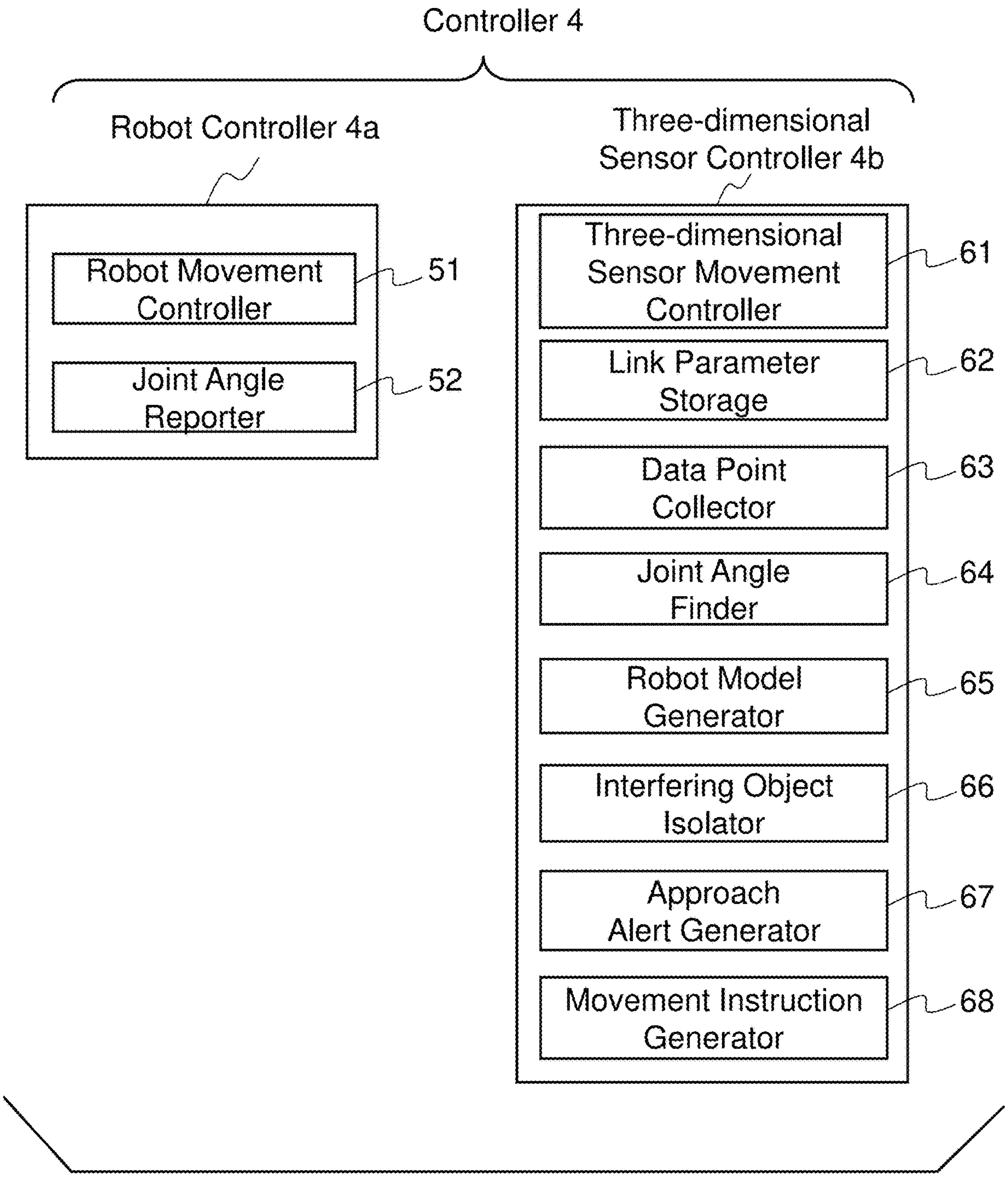
FIG. 2 is a block diagram showing a configuration of the controller shown in FIG. 1.

FIG. 2 is a block diagram showing configurations of the controllers shown in FIG. 1. The robot controller 4*a* and the three-dimensional sensor controller 4*b* implements the functions shown in FIG. 2 with software, such as the control programs, and hardware resources, such as the CPU 41*a* and the CPU 41*b*, that corroborate in operation.

The robot controller 4*a* includes a robot movement controller 51 and a joint angle reporter 52. The robot movement controller 51 controls start and stop of rotation of the drive motor of the robot arm 21 in accordance with instructions or the like from the control programs or external devices. The joint angle reporter 52 reports, to the three-dimensional sensor controller 4*b*, a contemporaneous joint angle of each joint of the robot arm 21 in the contemporaneous posture assumed by the robot 2.

The three-dimensional sensor controller 4*b* includes a three-dimensional sensor movement controller 61, a link parameter storage 62, a data point collector 63, a joint angle finder 64, a robot model generator 65, an interfering object isolator 66, an approach alert generator 67, and a movement instruction generator 68. The three-dimensional sensor movement controller 61 controls movements of the three-dimensional sensor 3 in accordance with instructions provided in the control programs or provided from external devices. The link parameter storage 62 stores the values of link parameters of the robot 2.

The link parameters are parameters that geometrically define relative positions between the links and the joints of the robot arm 21. For example, it is known that the link parameters may be set forth by Denavit-Hartenberg convention (D-H convention). The link parameters set forth by using the D-H convention may also be called D-H parameters. The link parameters set forth by using D-H convention may be summarized as follows:

1. The links and the joints are given numbers in the order of geometrical closeness to the base of the robot 2.
2. A link i is given coordinates (x[i], y[i], z[i]) in which a joint axis i being set as z[i].
3. The x[i] axis extends in an orientation normal to both the z[i] axis and a z [i+1] axis, and positively increments in the direction toward the z[i+1] axis.
4. The y[i] axis is set according to a right-handed coordinate system.
5. The link parameters consist of the following four parameters:
   (1) a link angle θ[i]=an angle measured from the x[i−1] axis to the x[i] axis around the z[i] axis;
   (2) a link distance d[i]=a distance measured from the x[i−1] axis to the x [i] axis along the z[i] axis;

(3) a link twist angle $\alpha[i]$=an angle measured from the z[i−1] axis to the z[i] axis around the x[i−1] axis;

(4) a link length a[i]=a distance measured from the z[i−1] axis to the z [i] axis along the x[i−1] axis.

The link angle $\theta[i]$ is the contemporaneous joint angle of each joint of the robot arm 21 reported by the joint angle reporter 52 of the robot controller 4*a*. The link parameter storage 62 stores in advance, except the link angle $\theta[i]$, three designed values of the link distance d[i], the link twist angle $\alpha[i]$, and the link length a[i].

The data point collector 63 collects, from the three-dimensional sensor 3, coordinates of surface points laid in a surface of an object present in the space that is photographically scanned by the three-dimensional sensor 3. The joint angle finder 64 receives, from the robot movement controller 51, a contemporaneous joint angle of each joint of the robot arm 21. The robot model generator 65 generates a virtual robot model that assumes a posture simulating a contemporaneous posture of the robot 2 based on the link parameters and the joint angles. The interfering object isolator 66 removes at least data points representing the robot itself from the collected data points by using the virtual robot model, and then presents the remaining data points as interfering object data points, which are defined by coordinates of surface points laid in a surface of the potentially interfering object. The approach alert generator 67 calculates a distance between the potentially interfering object and the robot by using the interfering object data points and the virtual robot model, and determines, based on the calculated distance between the potentially interfering object and the robot, whether the potentially interfering object is approaching the robot or not. The movement instruction generator 68 issues movement instructions to the robot controller 4*a* based on a result of determination by the approach alert generator 67. The configurations and functions thereof will be described in detail below with reference to FIGS. 3-6.

Figure 3:
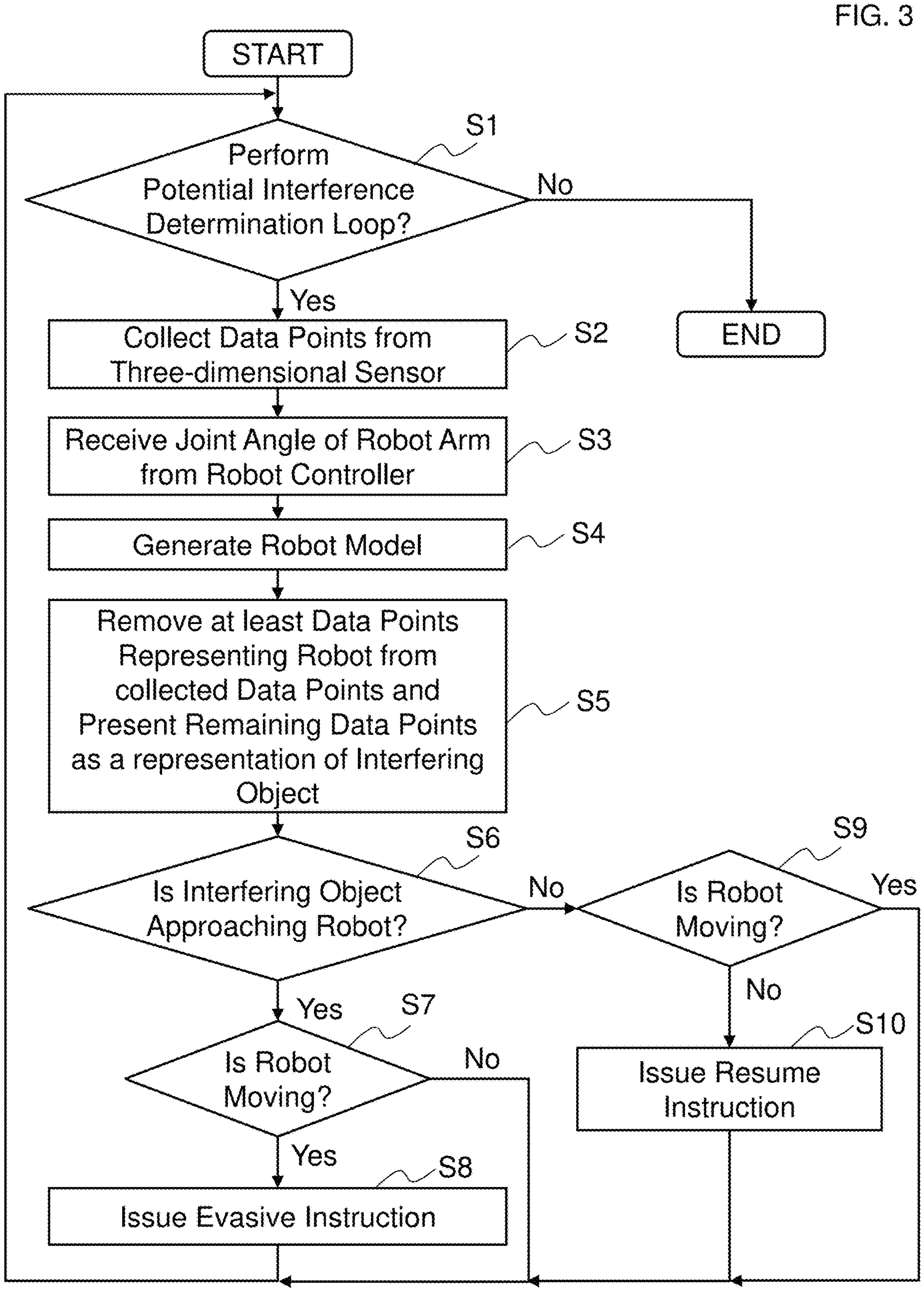
FIG. 3 is a flow chart showing a flow of exemplary processes executed by the controllers in FIG. 1.

FIG. 3 is a flow chart showing an exemplary flow of processes performed by the controllers in FIG. 1. As shown in FIG. 3, the three-dimensional sensor controller 4*b* determines whether to perform a potential interference determination loop or not (step S1). The potential interference determination loop repeats a determination process, i.e. the processes from step S2 to step S10, for detecting an approach of a potentially interfering object before an actual contact with the robot 2 occurs.

Once in the loop, while not receiving an on hold command from the robot controller 4*a* to halt the potential interference determination loop, the three-dimensional sensor controller 4*b* recursively performs the potential interference determination loop (step S1: YES). When receiving the on hold command from the robot controller 4*a* to halt the potential interference determination loop, the three-dimensional sensor controller 4*b* places the execution of the potential interference determination loop (step S1: NO) on hold. During an operation under a movement mode such as an operation of direct teaching in which an operator is manually guiding the robot 2 by hand, the robot controller 4*a* sends the three-dimensional sensor controller 4*b* the on hold command to place the execution of the potential interference determination loop on hold.

While in the potential interference determination loop, the data point collector 63 of the three-dimensional sensor controller 4*b* collects data points from the three-dimensional sensor 3 (step S2). As mentioned above, the collected data points are defined by three-dimensional orthogonal coordinates (x, y, z). The collected data points include data points that set forth the positions of surface points of objects, which may include the robot 2 itself, a work W, a table T, and/or a person M.

Next, the joint angle finder 64 of the three-dimensional sensor controller 4*b* receives, from the joint angle reporter 52 of the robot controller 4*a*, a contemporaneous joint angle of each joint of the robot arm 21 (step S3). For example, the joint angle reporter 52 of the robot controller 4*a* sends the three-dimensional sensor controller 4*b* a report on the joint angle detected by an encoder installed on a drive motor equipped at each joint.

Next, the robot model generator 65 of the three-dimensional sensor controller 4*b* generates a virtual robot model based on the link parameters stored in the link parameter storage 62 and the joint angles received by the joint angle finder 64 (step S4). The link parameters stored in the link parameter storage 62 include three parameters that set forth the link distance di, the link twist angle $\alpha i$, and the link length ai. Also, the joint angles received by the joint angle finder 64 are used as parameters that set forth the link angles $\theta i$, which are one type of the link parameters. The robot model generator 65 executes a forward kinematics calculation using the four link parameters, analytically calculates coordinates of data points (reference points) in parts of the robot 2 (which include all of the joints, the end effector 23, etc.). Then, based on the calculated reference points, the robot model generator 65 generates a virtual robot model that simulates a contemporaneous posture of the robot 2. By performing these processes, the robot model generator 65 can generate the virtual robot model sufficiently quickly and accurately to determine an approach of a potentially interfering object to the robot 2. By performing these processes, the robot system 1 can detect an approach of the potentially interfering object to the robot 2 at a timing that gives a sufficient time to take a movement to evade a potentially dangerous consequence.

Figure 4:
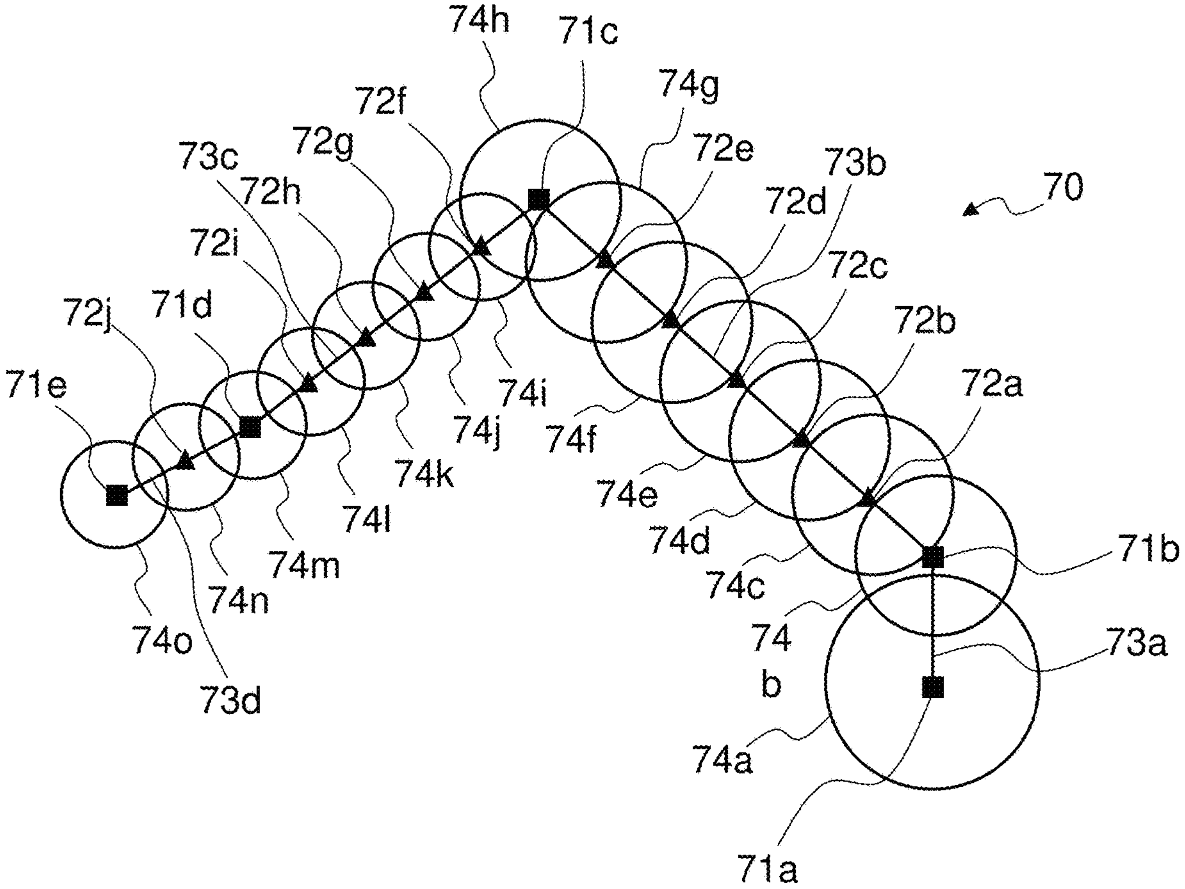
FIG. 4 is a schematic view illustrating an example of a virtual robot model.

FIG. 4 is a schematic view illustrating an example of the virtual robot model. A virtual robot model 70 simulates the robot 2 and is generated in a three-dimensional orthogonal coordinate space. It should be noted, however, that the virtual robot model 70 illustrated in FIG. 4 is drawn in a simplified manner in a two-dimensional orthogonal coordinate plain, which shows the virtual robot model 70 viewed from a particular direction in the three-dimensional orthogonal coordinates space. The same is also true in FIG. 5 and FIG. 6 described below.

Points 71*a*-71*e* represented by squares in the drawing are the reference points that set forth positions of the joints, the end effector 23, etc. calculated by the robot model generator 65. Although there are five reference points shown in the example in FIG. 4, the number of the reference points is not limited to a particular number. Also, points 72*a*-72*j* represented by triangles in the drawing are linear interpolating points generated along linear segments 73*a*-73*d* that connect the two adjacent reference points 71*a*-71*e*. The number of the linear interpolation points generated along the linear segments 73*a*-73*d* may differ in the respective segments. In the example shown in FIG. 4, the number of the linear interpolation points generated in the linear segment 73*a* is zero, the number of linear interpolation points generated in the linear segment 73*b* is five, the number of linear interpolation points generated in the linear segment 73*c* is four, and the number of linear interpolation points generated in the linear segment 73*d* is one. The numbers of the linear interpolation points are not limited to those shown in the example in FIG. 4 and can be adaptively changed according to the size and other factors of the robot 2. Also, the robot model generator 65 may generate the virtual robot model 70 using only the reference points, without generating the linear interpolation points.

The robot model generator 65 generates a robot object which takes a form of a spatial geometric figure defined along the reference points. The robot object is formed with one or more of virtual geometric figures collectively simulating the robot 2. The robot objects shown in FIG. 4 take a form of spheres 74*a*-740 having predetermined radii with the centers coincident with the reference points 71*a*-71*e* and the linear interpolation points 72*a*-72*j*, which are generated along the lines connecting the reference points 71*a*-71*e*. The spheres 74*a*-740 may be given a different radius to represent the size of each of the robot parts such as the robot arm 21 and the end effector 23.

The robot objects may take a form other than the spheres 74*a*-740 shown in FIG. 4. The robot objects may be in any shape as long as they simulate the robot 2 so that they include peripheral components, other than the robot arm 21, such as external wirings and the fixture base 22. For example, the robot objects may take a form of cubes with the centers coincident with the reference points 71*a*-71*e* and the linear interpolation points 72*a*-72*j*. Also, for example, the robot objects may take a form of cylindrical columns or rectangular parallelepipeds with the central axes coincident with the linear segments 73*a*-73*d* generated along the lines connecting the reference points 71*a*-71*e*.

Returning to FIG. 3, the interfering object isolator 66 of the three-dimensional sensor controller 4*b* removes at least data points representing the robot 2 itself from the data points collected by the data point collector 63. Here, the data points representing the robot 2 include the data points representing the robot arm 21, the fixture base 22, the end effector 23, the peripherals of the robot 2, and others. Then, the interfering object isolator 66 presents the remaining data points as a representation of the potentially interfering object (step S5). By performing these processes, the three-dimensional sensor controller 4*b* can isolate the data points representing the potentially interfering object from the data points representing the robot. That is, the three-dimensional sensor controller 4*b* can distinguish between the robot 2 and the potentially interfering object.

Figure 5:
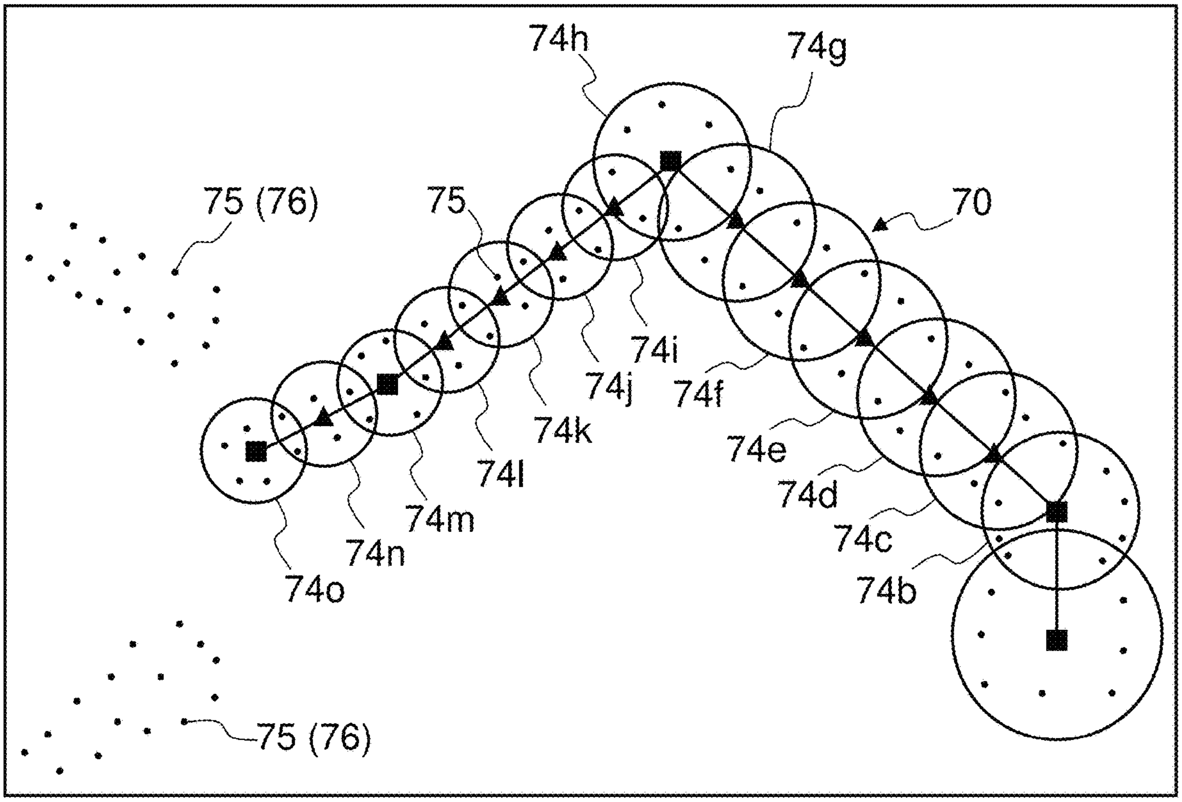
FIG. 5 is a schematic view illustrating a process by an interfering object data setting part.

FIG. 5 is a schematic view illustrating processes performed by the interfering object isolator. FIG. 5 shows the virtual robot model 70 in coexistence with the entire data points 75. The interfering object isolator 66 removes, among the entire data points 75, at least the data points located in the robot objects (i.e., the spheres 74*a*-74*o*) and presents the remaining data points as interfering object data points 76. By performing these processes, the interfering object isolator 66 can distinguish between the robot 2 and the potentially interfering object sufficiently quickly and accurately to determine an approach of the potentially interfering object to the robot 2. By performing the processes, the robot system 1 can detect an approach of the potentially interfering object to the robot 2 at a timing that gives a sufficient time to take a movement to evade a potentially dangerous consequence.

Here, in addition to removing only the data points representing the robot 2 from the entire data points 75, the interfering object isolator 66 may also remove data points representing objects that are not recognized as potentially interfering objects. The objects that are not recognized as the potentially interfering objects other than the robot 2 include, for example, the work W and the table T. For example, where the end effector 23 operates as a tool to hold the work W, a contact between the end effector 23 and the work W should be permissible and thus the work W should not be recognized as a potentially interfering object. Also, for example, when the table T is placed as a stationary object at a predeterminable position, the robot controller 4*a* controls the movement of the robot 2 to restrict its movable range so that the robot arm 21 does not come into contact with the table T. In such a setting, the table T should not be recognized as a potentially interfering object. For example, the interfering object isolator 66 may be taught in advance an environment map locating the work W and the table T, and may remove the data points representing the work W and the table T from the entire data points 75 in a manner similar to the manner in which the data points representing the robot are removed.

Returning to FIG. 3, the approach alert generator 67 of the three-dimensional sensor controller 4*b* calculates the distance between the potentially interfering object and the robot 2 by using the interfering object data points 76 and the virtual robot model 70, and determines whether the potentially interfering object is approaching the robot 2 or not, based on the distance between the potentially interfering object and the robot 2 (step S6).

Figure 6:
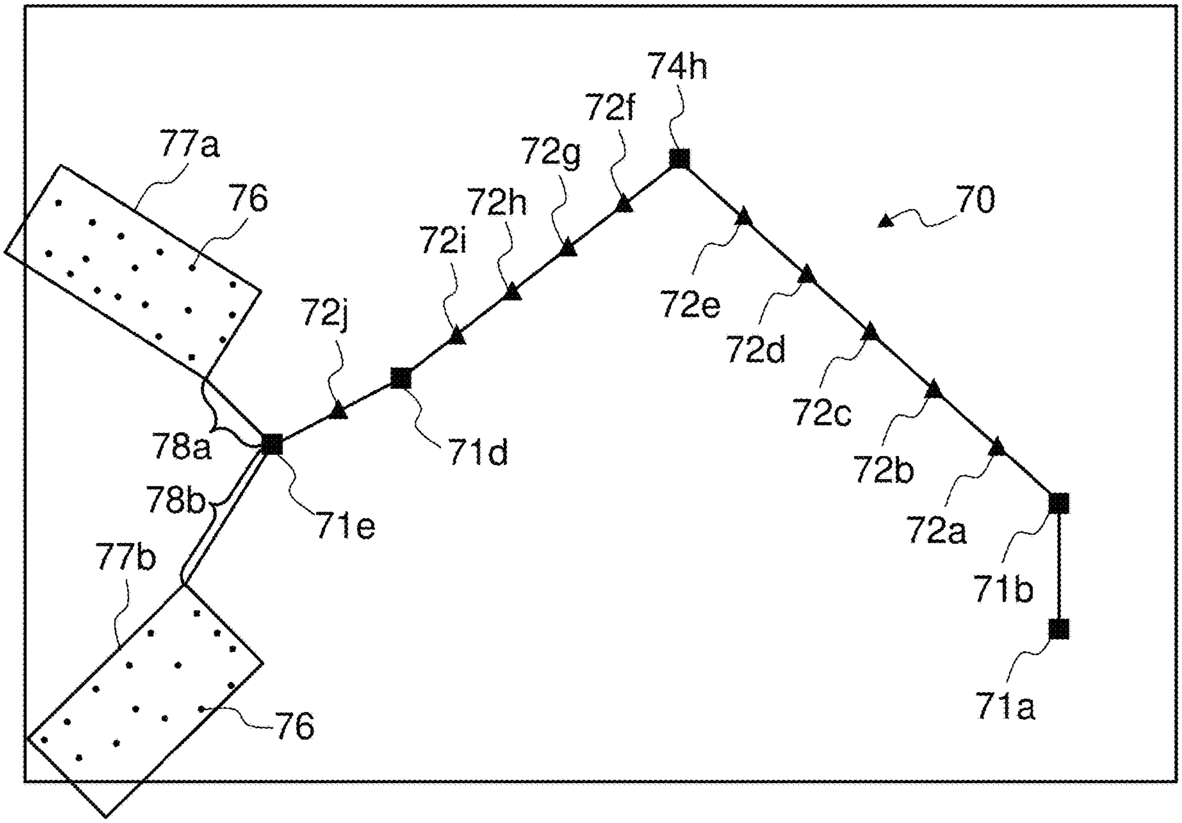
FIG. 6 is a schematic view illustrating a process by an approach determination part.

FIG. 6 is a schematic view illustrating processes performed by the approach alert generator 67. FIG. 6 shows the virtual robot model 70 in coexistence with the interfering object data points 76. The number of the potentially interfering objects may not be limited to one, and a plurality of potentially interfering objects may be recognized as approaching the robot 2 from different directions. So, the approach alert generator 67 divides the interfering object data points 76 into groups of data points and calculates the distance between the robot 2 and each group of the interfering object data points 76. By performing these processes, the approach alert generator 67 can quickly and accurately determine approaches of the potentially interfering objects to the robot 2. By performing the processes, the robot system 1 can detect approaches of the potentially interfering objects to the robot 2 at a timing that gives a sufficient time to take a movement to evade a potentially dangerous consequence.

Since the interfering object data points 76 are formed of data points, the process of dividing the interfering object data points 76 into groups is performed by dividing the data points into groups. The approach alert generator 67 performs grouping of the interfering object data points by applying a clustering method to the interfering object data points 76, for example, a clustering method of Point Cloud Library (PCL), which is an open source software library, (i.e., a method using Euclidean Cluster Extraction class). These clustering methods can divide scattered data points into smaller groups.

Also, the approach alert generator 67 applies a PCL shape approximation method (i.e., a method using Moment Of Inertia Estimation class) to each group of the interfering object data points 76 to generate a bounding box that takes a form of a spatial geometric figure representing the potentially interfering object. The bounding box may take a form of a rectangular parallelepiped including given data points. The spatial geometric figure simulating the potentially interfering object may take a form other than the bounding box (the rectangular parallelepiped) and may take a form of any other spatial geometric figure such as a sphere or a cylindrical column.

Then, the approach alert generator 67 calculates Euclidean distances between the bounding box and the reference points or the linear interpolating points. Since the reference points and the linear interpolating points are present in plural, the approach alert generator 67 calculates Euclidean distances between the bounding box and each of these points, and the minimum value (a value of the shortest distance) is taken as the distance between the potentially interfering object and the robot 2. The example in FIG. 6 shows a bounding box 77*a* and a bounding box 77*b* each including interfering object data points 76. For example, the bounding box 77*a* may represent a left arm of an operator, and the bounding box 77*b* may represent a right arm of the operator. A distance 78*a* is a distance between the bounding box 77*a* and the reference point 71*e* and a distance 78*b* is a distance between the bounding box 77*b* and the reference point 71*e*, and the distance 78*a* and the distance 78*b* are the minimum distance values measured among the reference points and the linear interpolating points. The approach alert generator 67 determines that an interfering object is approaching the robot 2 when the distance between at least one of the potentially interfering objects formed of a group of interfering object data points 76 and the robot 2 is equal to or less than a threshold value. In the example in FIG. 6, when at least one of the distances 78*a* and 78*b* is equal to or less than the threshold value, the approach alert generator 67 determines that an interfering object is approaching the robot 2.

Although the approach alert generator 67 determines whether or not a potentially interfering object is approaching the robot 2 based on the distance between the potentially interfering object and the robot 2 in the above description, the determination may alternatively be made based on a relative approaching speed between the potentially interfering object and the robot 2. For example, the approach alert generator 67 can calculate the relative approaching speed between the potentially interfering object and the robot 2 by determining a change of the relative position between the potentially interfering object and the robot 2 that is measured from a previously collected set of data points and is measured from a recently collected set of data points and by dividing the change of the relative position by the time interval between the previous collection and the recent collection of the data points. Then, alternative to using the distance, as a threshold value, between the potentially interfering object and the robot 2, the approach alert generator 67 may uses a threshold value that is proportional to the relative approaching speed between the potentially interfering object and the robot 2. By performing these processes, even when the speed of the potentially interfering object approaching the robot 2 is fast, an instruction to evade a potentially dangerous consequence can be issued at a timing that gives a sufficient time to avoid a potentially dangerous consequence.

Also, although in the above description the approach alert generator 67 calculates the distances between the spatial geometric figure simulating the potentially interfering object and the data points plotted along the posture of the robot 2 (the reference points or the interpolating points) to determine the distance between the potentially interfering object and the robot 2, any other calculation methods may be used. For example, the approach alert generator 67 may calculate a distance between the spatial geometric figure simulating the interfering object and a spatial geometric figure simulating the robot 2 (the robot object). Also, for example, the approach alert generator 67 may calculate distances between the data points included in the interfering object data points 76 and the spatial geometric figure simulating the robot 2. Alternatively, for example, the approach alert generator 67 may calculate distances between the data points included in the interfering object data points 76 and the points that set forth the positions of the robot 2. In summary, the approach alert generator 67 calculates, as the distance between the potentially interfering object and the robot 2, the distances between the data points included in the interfering object data points 76 or the spatial geometric figures defined according to the interfering object data points, and the data points included in the virtual robot model 70 or the spatial geometric figures defined according to the virtual robot model 70.

Returning to FIG. 3, if the approach alert generator 67 determines that a potentially interfering object is approaching the robot 2 (step S6: YES), the movement instruction generator 68 of the three-dimensional sensor controller 4*b* determines whether the robot 2 is moving or on hold (step S7). It the robot 2 is moving (step S7: YES), the movement instruction generator 68 issues an instruction to the robot controller 4*a*, as an instruction to evade a potentially dangerous consequence, to place the robot 2 on hold and returns to the step S1 (step S8). If the robot 2 is on hold (step S7: NO), the movement instruction generator 68 does nothing and returns to the step S1 (step S10).

On the other hand, if the approach alert generator 67 determines that a potentially interfering object is not approaching the robot 2 (step S6: NO), the movement instruction generator 68 determines whether the robot 2 is moving or on hold (step S9). If the robot 2 is moving (step S9: YES), the movement instruction generator 68 does nothing and returns to the step S1. If the robot 2 is on hold (step S9: NO), the movement instruction generator 68 issues an instruction, as an on-hold lifting instruction to the robot controller 4*a* to resume the movement of the robot 2 and returns to the step S1 (step S10).

The instruction to evade a potentially dangerous consequence issued in the step S8 is not limited to the instruction to place the robot on hold and may be an instruction to slow down or an instruction to take a detour along a contact-avoidance route, for example. Similarly, the on-hold lifting instruction issued in the step S10 is not limited to the instruction to resume the movement and may be an instruction for acceleration or an instruction to take the shortest route, for example.

As described above, the robot system 1 according to the embodiments of the present invention can distinguish between the robot 2 and the potentially interfering object and detect an approach of the potentially interfering object. Since the three-dimensional sensor 3 is used in the robot system 1 according to the embodiments of the present invention, by properly selecting the installation location of the three-dimensional sensor 3 and the positional relationship between the robot 2 and the three-dimensional sensor 3, the robot system 1 can have a wide range of detection area to detect an approach of the potentially interfering object. Also, the robot system 1 according to the embodiment of the present invention is workable with the robot 2 of any shape and size, and thus there is no need to change the hardware configuration that is uniformly workable with a different model of the robot 2, thereby facilitating introduction of the system.

The conventional proximity sensor using the electrostatic capacitance method has a short detection range to detect changes in electrostatic capacitance and may not be able to give a sufficient time to take an evasive movement to avoid a potentially dangerous consequence after the detection of an approach of the potentially interfering object. On the other hand, the robot system 1 according to the embodiments of the present invention uses the three-dimensional sensor 3, in place of the conventional proximity sensor using the capacitance method, that can provide a wider detection range to detect an approach of the potentially interfering object, and thus can give a sufficient time to take a movement to evade a potentially dangerous consequence after the detection of an approach of the potentially interfering object.

Further, the conventional proximity sensor using the electrostatic capacitance method is susceptible to water droplets on the detection surface or changes of humidity, which can compromise its ability to detect the potentially interfering object. On the other hand, the robot system 1 according to the embodiments of the present invention uses the three-dimensional sensor 3 that is not affected by changes of atmospheric conditions such as changes of humidity, and thus can stably detect an approach of the potentially interfering object under any atmospheric conditions.

Although the preferred embodiments of the robot system and the like according to the present invention have been described referring to the attached drawings, the technical scope of the present invention is not limited to the embodiments described above. It is obvious that persons skilled in the art can think out various changes or modifications to the embodiments within the scope of the technical idea disclosed in the claims, and it will be understood that they naturally belong to the technical scope of the present invention.

What is claimed is:

1. A robot system comprising:

at least one robot each having a robot arm;

at least one three-dimensional sensor configured to photographically scan a space including a movable range of the robot; and at least one controller programmed to control movements of the robot and the three-dimensional sensor, wherein the controller comprises at least one memory; and at least one processor configured to execute a computer program stored in the memory, wherein the processor executes the computer program to implement:

storing values of link parameters of the robot in the memory;

from the three-dimensional sensor, collecting datapoints, which includes coordinates of data points that set forth positions of surface points in a surface of an object found in the space;

receiving a contemporaneous state of joint angles of respective joints of the robot arm;

analytically calculating coordinates of reference points of the robot by running a forward kinematics calculation using the link parameters and the joint angles;

generating a virtual robot model represented by a plurality of spatial geometric figures derived from the reference points, wherein the virtual robot model simulates a contemporaneous posture of the robot;

removing at least data points representing the robot from the collected data points by using the virtual robot model and presenting the remaining data points as interfering object data points, which include coordinates of data points that collectively set forth a position of a potentially interfering object; and calculating a minimum Euclidean distance between at least one geometric point among geometric points representative of the potentially interfering object and at least one geometric point derived from the virtual robot model and determining that the potentially interfering object is approaching the robot, when the minimum Euclidean distance is equal to or less than a threshold value.

2. The robot system according to claim 1, wherein the processor is programmed to implement generating the virtual robot model represented by a plurality of spatial geometric figures defined around the respective reference points, and by linear segments connecting two adjacent reference points.

3. The robot system according to claim 2, wherein the processor is programmed to implement generating the virtual robot model represented by a plurality of spatial geometric figures along linear segments connecting two adjacent reference points.

4. The robot system according to claim 1, wherein the processor is programmed to implement:

calculating a relative approaching speed between the potentially interfering object and the robot based on a change in a relative position between the potentially interfering object and the robot over a predetermined time interval; and determining that the potentially interfering object is approaching the robot, based on a second threshold value that is proportional to the relative approaching speed.

* * * * *